F. BEEMER.
CHANGE SPEED GEARING.
APPLICATION FILED OCT. 8, 1913.

1,373,547.

Patented Apr. 5, 1921.
3 SHEETS—SHEET 1.

WITNESSES:

INVENTOR
Frank Beemer
BY
Augustus B. Stoughton
ATTORNEY

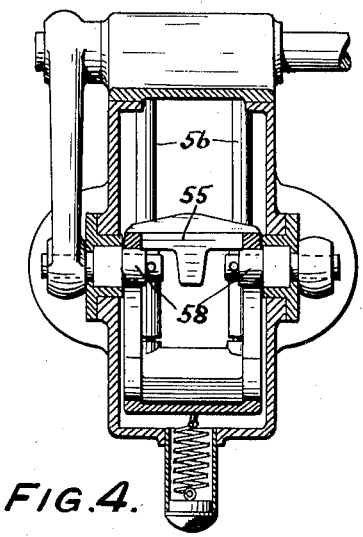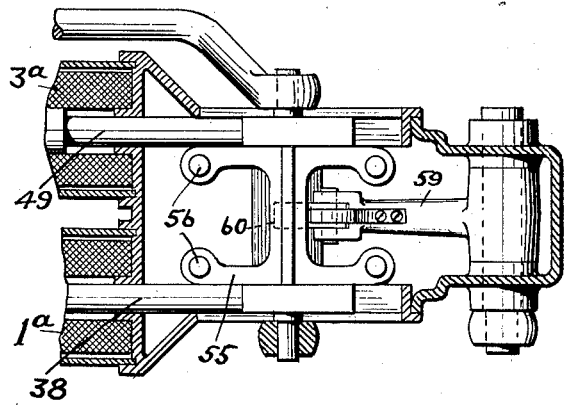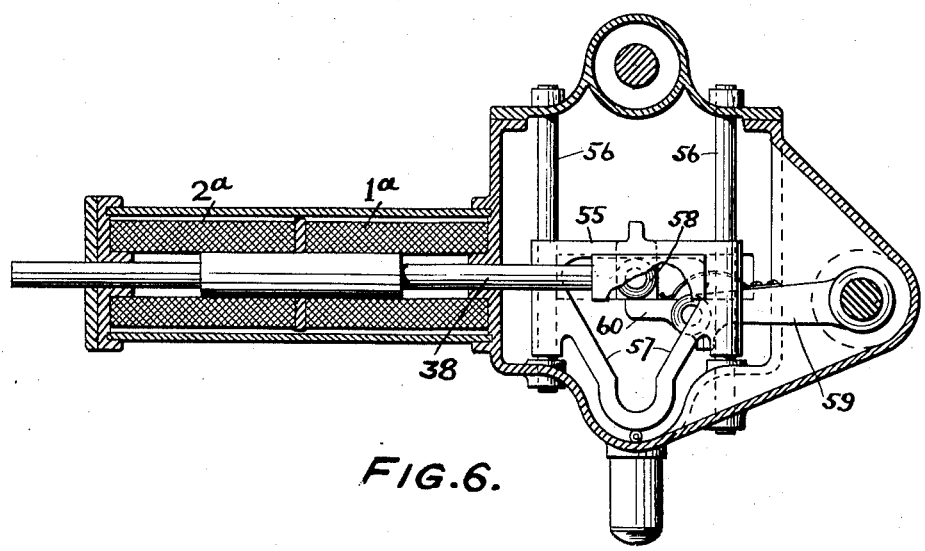

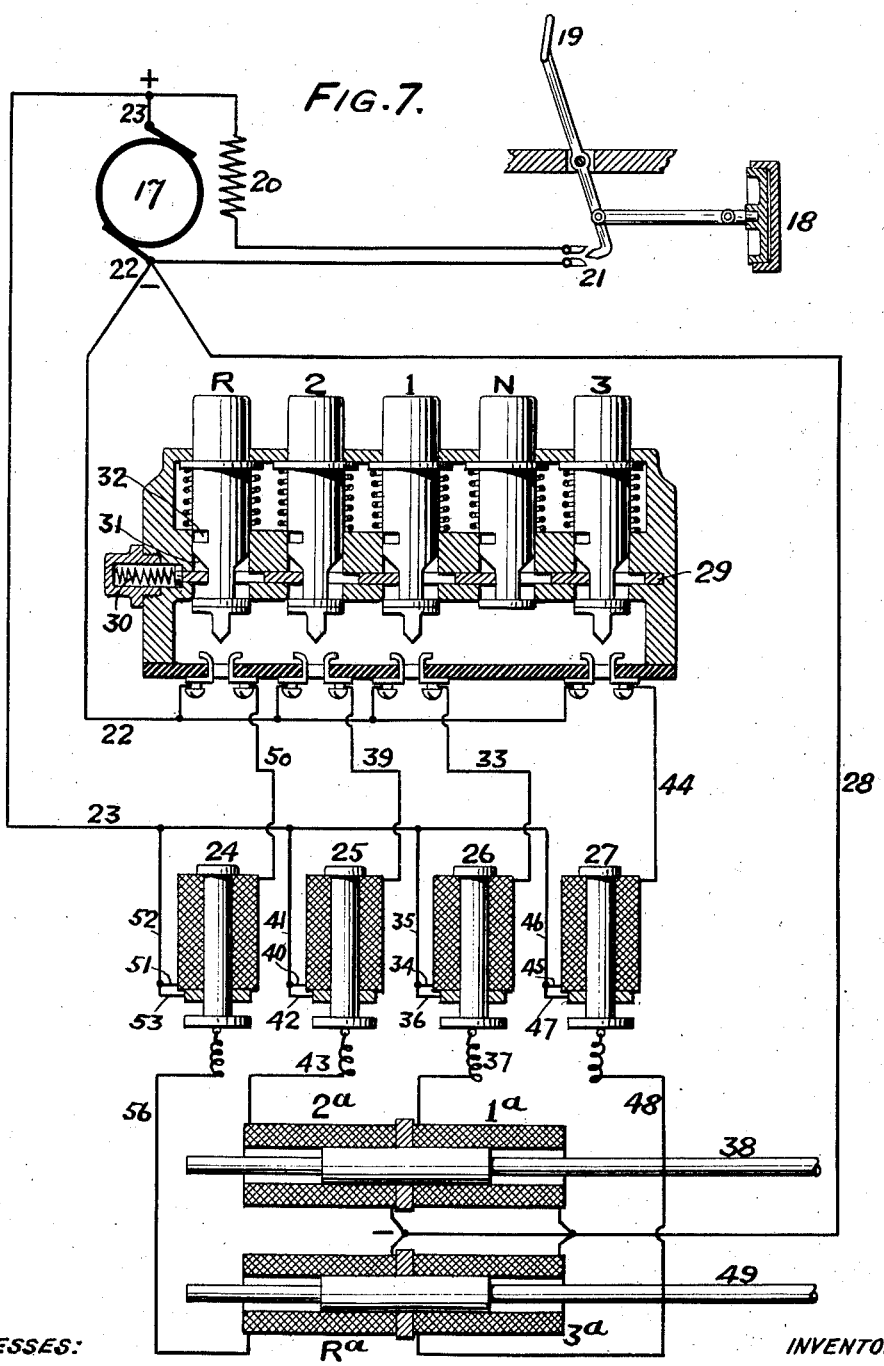

UNITED STATES PATENT OFFICE.

FRANK BEEMER, OF PHILADELPHIA, PENNSYLVANIA, ASSIGNOR TO VULCAN MOTOR DEVICES COMPANY, OF PHILADELPHIA, PENNSYLVANIA, A CORPORATION OF PENNSYLVANIA.

CHANGE-SPEED GEARING.

1,373,547.     Specification of Letters Patent.     Patented Apr. 5, 1921.

Application filed October 8, 1913. Serial No. 793,993.

*To all whom it may concern:*

Be it known that I, FRANK BEEMER, a citizen of the United States, and a resident of Philadelphia, in the county of Philadelphia and State of Pennsylvania, have invented a certain new and useful Change-Speed Gearing, of which the following is a specification.

The principal object of the present invention is to provide a change-speed gearing for automobiles, or the like, in which when the vehicle is running on any gear the next gear to be employed or gear shift to be made can be selected and in which the gear shift so selected can be made at any future time; or in other words, to provide a gear shift having an anticipatory setting.

The invention will be claimed at the end hereof, but will be first described in connection with the accompanying drawings forming part hereof, and in which—

Figure 1:
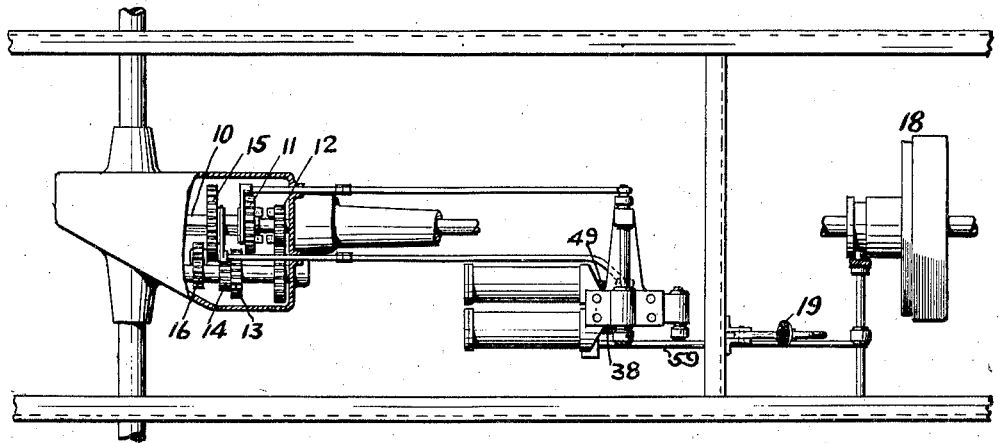
Figure 1, is a top or plan view of parts of an automobile equipped with an electrically controlled change-gear.
Figure 2:
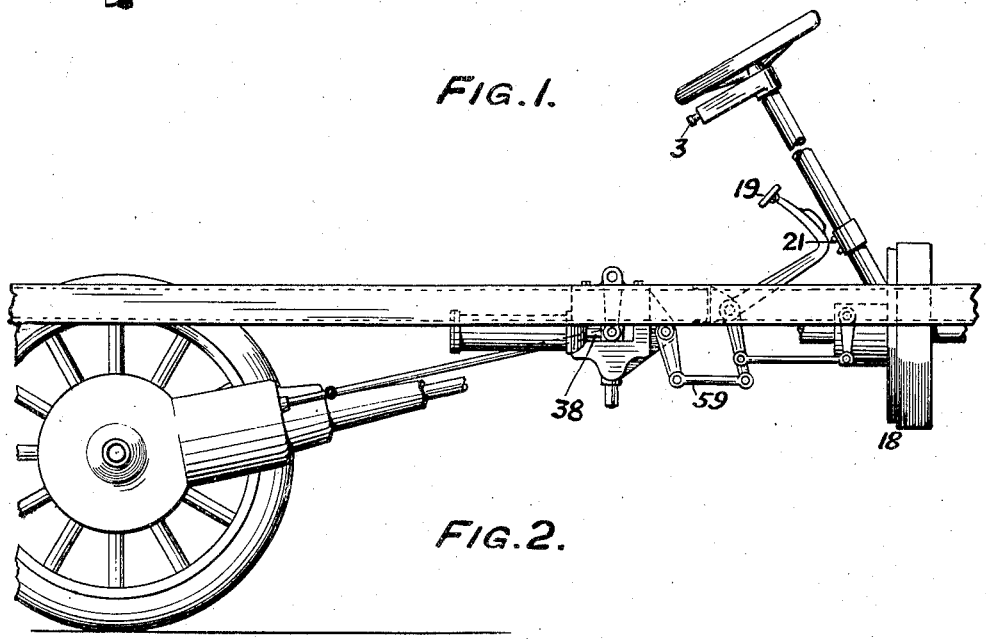
Fig. 2, is a side view of the same.
Figure 3:
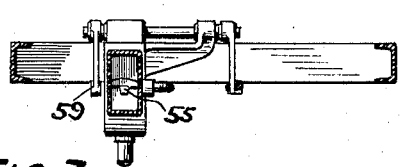
Fig. 3, is a detail front view.

Figs. 4, 5, and 6, are respectively front, plan and elevational sectional views, and Fig. 7, is a diagrammatic view.

In the drawings 10 is a shaft and it is provided with variable speed transmission mechanism which includes a plurality of sets of power transmission elements. 11 and 12 are a set of these elements for first speed. 11 and 13 are a set of these elements for second speed. 14 and 15 are a set of these elements for third speed and 15 and 16 are a set of these elements for reverse. $1^a$, $2^a$, $3^a$, and $R^a$, together with the source 17, are means for placing any set of these transmission elements in and out of driving relation with the shaft 10 at selected times. R, 2, 1 and 3 are selector mechanism by which one set of transmission elements may be selected for subsequent operation while another set of transmission elements is in operation. 18 is a clutch by means of which the shaft 10 is or is not driven from the engine, according to the position of the clutch. 19 is a pedal for operating the clutch and the source 17 is operable from the pedal since its field circuit 20 is made or broken by the contact 21, opened and closed by the pedal. It being, of course, understood that when the field circuit is broken the source of power can do no work and its armature is dead. One side 22 of the circuit is connected to one of the contacts of each push button and the other contact of each push button is connected to the other side 23 of the circuit through one of the relay magnets 24, 25, 26 and 27. The armature of each relay magnet is a circuit closer which connects the winding to which it leads to the side 23 of the circuit. All of the windings are connected by the conductor 28 with the side 22 of the circuit. 29 is an interlock actuated by a spring 30 and it consists of a plate having openings that coöperate with cam shaped stems 31 and notches 32 on the push buttons in such a way that whenever a push button is pushed down it is locked by the plate 29 until another push button is pushed down, when the first push button is released. The interlock device is not necessary as everything can be done by hand without it which can be accomplished with it. But as will be apparent, omission of the lockdown feature of the interlock would necessitate manual retention of the selector buttons which is obviously undesirable, one of the prime objects of the shifting mechanism being to enable the driver to use both hands for steering.

Evidently any speed, including reverse, may be selected by simply pushing down the button and holding it, either manually or by means of the interlock when present, and the mere pushing down of a button accomplishes nothing in the way of shifting gears or changing speed, because the circuit is broken by the contact 21 on the clutch lever, hence any anticipatory setting can be made and nothing at all will happen until thereafter and upon the operation of the clutch 18.

When button 1 is pushed down the path of the circuit is from 22 through its contacts, by 33, through 26, 34, 35, to the other side 23 of the circuit. This energizes the relay and closes a circuit from 23 by 35 by 36, through the contact of the relay by 37, through winding $1^a$ and thence by 28 to 22. Of course the winding $1^a$ is not energized so long as the field circuit is broken by the clutch at 21, because there is no current in the armature circuit, but when the clutch is pushed then the winding $1^a$ is energized and pulls the rod 38 toward the right in Figs. 7 and 1, and brings the set of gears 11 and 12 into position for giving first speed; that is high speed.

When the button 2 is pushed it causes the interlock to release the button 1 and at the same time the button 2 closes its contact establishing a path for current from 22, through button contacts by 39, through 25 by 40 and 41 to 23, thus closing the contact of the relay and establishing a circuit path by 41, 42 and 43, winding $2^a$ and conductor 28. When the contact 21 is closed at the clutch the coil $2^a$ is energized, shifting the rod 38 toward the left and putting the set of gears 11 and 13 in mesh, thus establishing second speed.

When the button 3 is pushed a circuit path is established from 22 through the button contacts by 44, through relay 27, by 45 and 46 to 23 and simultaneously from 23 by 46, 47, relay contact 48 to winding $3^a$ and thence by 28 to 22. When the clutch contact 21 is closed, winding $3^a$ is energized, rod 49 is shifted toward the right, bringing the elements 15 and 14 into engagement for third speed.

When the button R is pushed a circuit path is established from 22 by button contacts, by 50, through 24 by 51, 52 to 23. Another circuit is established from 23 by 51, 52, relay contacts, 54, winding $R^a$ and 28. When the clutch lever is opened to make contact, winding $R^a$ is energized, rod 49 is pulled toward the left in Figs. 7 and 1 and gears 15 and 16 are put into reverse position.

N is a neutral button. It is a blank electrically and its only function is that it can be pushed, and when pushed, releases any other button that may be down.

If it be assumed for the sake of further description that button 1 has been pushed, the clutch operated, the coil $1^a$ energized and the rod 38 shifted so as to bring about first speed, the car will be running on that speed and the clutch, of course, will be in and the field circuit will be broken at 21, so that the gear shifting means, to wit, the various coils will be dead. That is, there will be no current through them. At any time when the car is thus running on first speed and in anticipation of the next gear shift, the operator may select what the next gear shift will be. We will assume that he selects second speed. This being so, the operator pushes down button 2 and in doing this he releases button 1 and locks down button 2, if the interlock is present. If the interlock is not present he can simply hold down button 2 with his finger. Nothing happens in either case, because the source 17 is dead, its field circuit being broken at 21. However, when the operator gets ready to make a gear shift, which he has previously selected, namely second speed, he pushes the clutch, immediately the source 17 becomes effective, the coil 2 is energized and the gears are shifted into second speed. As soon as this gear change has been effected, the clutch is released, with the result that all the circuits are dead so that the car remains and runs in second speed and this whether the button 2 be up or down. Of course this is equally true as to all of the buttons, so that any set of transmission elements may be selected for subsequent operation while another set of transmission elements is in operation.

Before any change of gears is made it is necessary that all the gears be brought into neutral position. In the present instance this is accomplished mechanically, rather than electrically, by means of a yoke 55, arranged to rise and fall on guides 56 and shaped, when raised, to draw the rods 38 and 49 into neutral position by its inclined faces 57 which operate on rollers 58 on those rods. The yoke is lifted every time the clutch pedal is moved through a full stroke by a system of levers and shafts 59 of which one is provided with a trigger 60 which, when the clutch pedal is turned to throw the clutch out, operates under the yoke and lifts it and then lets it fall but in such a way that the trigger 60 by turning passes back under the yoke for the next operation. When the clutch lever is moved the first thing that happens is to free the clutch and the next thing is to lift the yoke, thus getting all the gears into neutral position and the next thing is to close the circuit of the field so that the gear shifting mechanism can shift a gear in accordance with the particular push button that has been pushed down to make the appropriate path for the circuit. Of course the apparatus can be operated in another way, that is, the clutch lever may be first pushed to free the clutch, bring all the gear shifts to neutral and close the field circuit of the dynamo and thereafter and while the clutch is in this position any push button selected can be pushed, making the desired gear shift and then when the clutch lever is returned, the circuit is broken through the field and the gear shift so made remains until the operation is repeated. This is equally true whether the interlock be present or not.

What I claim is:

1. The combination with a shaft and variable speed transmission mechanism therefor, including a plurality of sets of power transmission elements, of means for placing each set of said transmission elements in and out of driving relation with the shaft at selected times, and mechanism by which each set of transmission elements may be selected for subsequent operation while one set of transmission elements is in operation.

2. The combination with a shaft, a clutch therefor and a pedal for operating the clutch, of transmission mechanism including sets of power transmission elements, means operable from the pedal for placing each set of transmission elements in and out of driving relation with the shaft at selected times, and mechanism for selecting each set of transmission elements, while one set of such elements is in operation, such selected set of elements being moved into operation upon a subsequent actuation of the pedal.

3. The combination with a shaft and variable speed transmission mechanism therefor, including a plurality of sets of power transmission elements, of means for placing each set of said transmission elements in and out of driving relation with the shaft at selected times, and mechanism by which each set of transmission elements may be selected for subsequent operation while one set of transmission elements is in operation, said mechanism including a selector device which is self retained in its different operative positions.

4. The combination with a shaft, a clutch therefor and a pedal for operating the clutch, of transmission mechanism including sets of power transmission elements, means operable from the pedal for placing each set of transmission elements in and out of driving relation with the shaft at selected times, and mechanism for selecting each set of transmission elements, while one set of such elements is in operation, such selected set of elements being moved into operation upon a subsequent actuation of the pedal, said mechanism including a selector device which is self retained in its different operative positions and which upon each operation thereof inherently terminates the previous selection made thereby.

In testimony whereof I have hereunto signed my name.

FRANK BEEMER.

Witnesses:
S. E. PATTERSON,
FRANK E. FRENCH.